United States Patent [19]
Whittaker

[11] Patent Number: 5,687,348
[45] Date of Patent: Nov. 11, 1997

[54] VARIABLE-DEPTH, SELF-REGULATING CACHE QUEUE FLUSHING SYSTEM

[75] Inventor: Bruce Ernest Whittaker, Mission Viejo, Calif.

[73] Assignee: Unisys Corporation, Blue Bell, Pa.

[21] Appl. No.: 593,764

[22] Filed: Jan. 29, 1996

[51] Int. Cl.$^6$ .................................................. G06F 13/00
[52] U.S. Cl. ................................... 395/460; 395/473
[58] Field of Search .................................. 395/250, 460

[56] References Cited

U.S. PATENT DOCUMENTS

| | | | |
|---|---|---|---|
| 4,195,340 | 3/1980 | Joyce | 395/460 |
| 4,864,543 | 9/1989 | Ward, Jr. et al. | 365/221 |
| 5,058,006 | 10/1991 | Durdan et al. | 395/449 |

*Primary Examiner*—Krisna Lim
*Attorney, Agent, or Firm*—Alfred W. Kozak; Mark T. Starr; Steven R. Petersen

[57] ABSTRACT

A FIFO invalidation queue for address words, from a spy module, are held for subsequent invalidation operations to a cache memory. The FIFO queue is programmably organized to indicate when it is almost full in which case it will switch to a priority operation which will give priority to invalidation cycles in the cache over the priority of the processor's cache access. When the FIFO queue indicates that it is almost empty, then the priority of the cache access by the processor is re-established as it was in normal conditions. The system operates concurrently in a self-regulating manner to load and unload addresses into the FIFO queue while also giving priority to flushing out the queue with invalidation cycles when preset upper limits are reached.

6 Claims, 9 Drawing Sheets

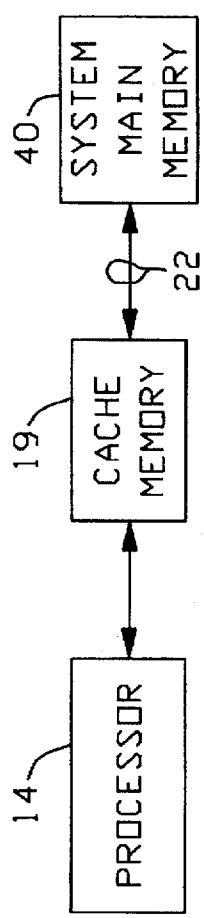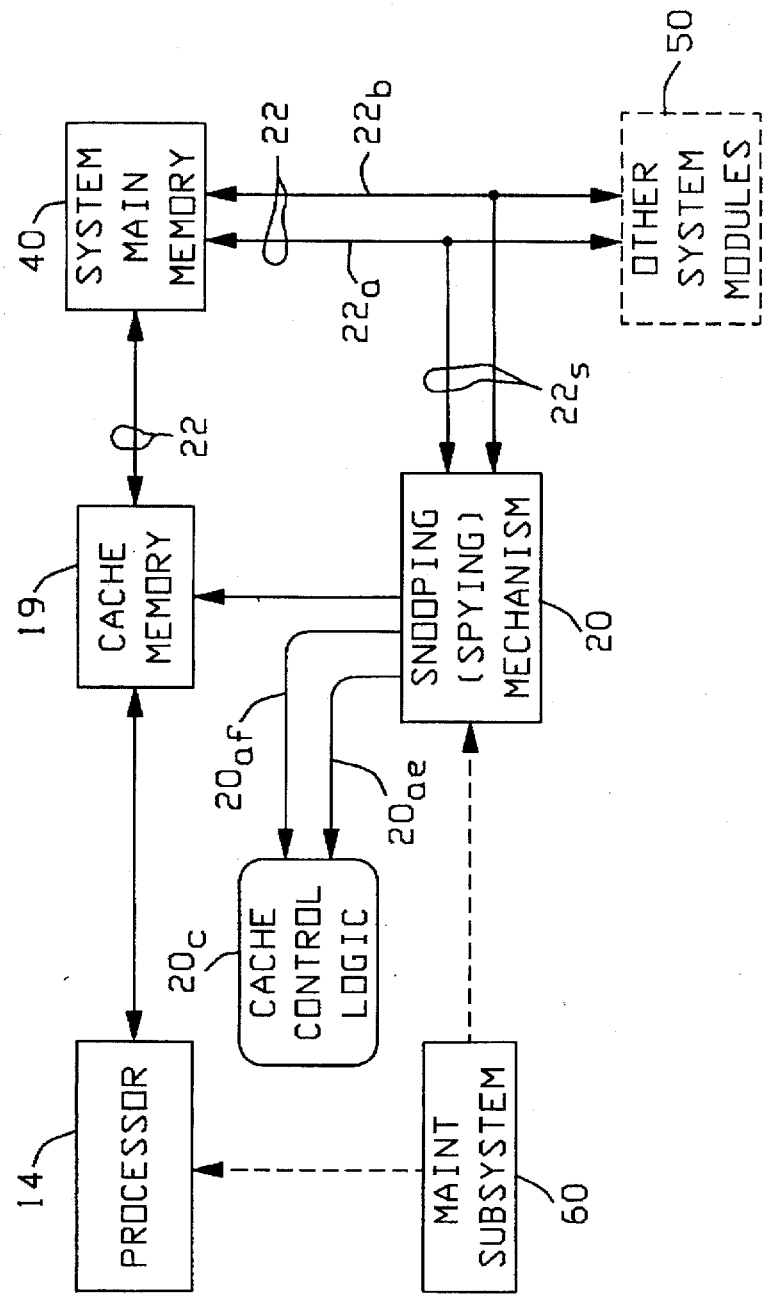

VARIABLE-DEPTH, SELF-REGULATING CACHE QUEUE FLUSHING SYSTEM

BACKGROUND OF THE INVENTION

Referring to FIG. 8, there is indicated a simple diagram of a computer system where a processor 14 has almost immediate fast accessibility to desired data from a cache memory 19 as long as the cache memory holds the data requested by the processor 14. The cache memory 19 is also connected to the system main memory 40 over a system bus 22 which enables data from system main memory to be placed in the cache memory 19 when needed and also to provide requested data to the processor 14.

FIG. 9 is an expanded view of a digital processing system where the processor 14 communicates with the cache memory 19 which also connects with the system main memory 14 over a system bus means 22. The system bus means 22 is a dual system bus means having dual redundant busses 22a and 22b which communicate not only to other system modules 50, but also provide connections to a snoop or spy circuit 20 wherein any modifications to data in the system main memory 40, such as "writes", will be sent as address information by the snoop mechanism 20 and passed on to the cache memory 19 to insure that any of the old stale data having the snooped address, will no longer be considered valid in the cache memory. In FIG. 9, the snoop and spy busses are indicated as 22s. The snoop-spy bus 22s functions to monitor all system bus operations that can modify main memory and operates to report the address of any such operations to the cache memory module 19 by means of the spy mechanism 20. The cache memory 19 must test these address locations against those address held within the cache, and if a match of the address location occurs, the cache memory 19 must "invalidate" the address location within the cache since the data that corresponds to it is no longer currently valid.

The spy circuit mechanism 20 of FIG. 9 holds addresses from the system busses 22a and 22b which involve memory data which has been modified. Subsequently, these address values are then used for address invalidation scanning by the cache memory 19. It could be speculated that the spy circuitry mechanism 20 could hold as few as one address at a time, but however, such a small number would require that the cache "immediately" take this address value and "immediately" do the invalidation cycle. Without the "immediate" response by the cache memory 19, more system bus address operations might then be lost. Thus, holding of a "single address" value in the spy circuitry mechanism 20 would not be an acceptable performance consideration. Generally, some queuing of the addresses from the spy operations is provided by means of a queue of addresses often called the invalidation queue. This queue provides a time-buffer between the system bus operations on system bus 22 and the processor-cache operations between processor 14 and cache memory 19. The present system is designed to provide a queuing mechanism that is asynchronous, of adjustable variable-depth, and also of self-regulating operation.

In a previously filed case, U.S. Ser. No. 08/078,361 which has a issued at U.S. Pat. No. 5,506,967 and which was entitled "Storage Queue with Adjustable Level Thresholds for Cache Invalidation Systems in Cache Oriented Computer Architecture", involved an invalidation queue structure with adjustable upper and lower level limits. An upper limit determining means provided a QUEUE-FULL signal when the number of invalidation addresses in the queue structure reached an adjustable upper limit. The queue structure had a lower limit determining means providing a queue not full signal when the number of invalidation addresses in the queue reached an adjustable lower limit. That system operated so that the invalidation queue was flushed in response to the QUEUE-FULL signal and the flushing was discontinued in response to the QUEUE-NOT-FULL signal. The system allowed setting the upper limit at less than a maximum capacity of the queue and also enabled setting the lower limits sufficiently high to reduce the queue flushing time so as to minimize the bus retry condition and processor waiting times.

This earlier supplied system of U.S. Ser. No. 078,361now U.S. Pat. No. 5,506,967 ran into this situation of the "RETRY" case which involves a significant system performance cost since many of the other system modules in the network would be hung up waiting for the processor to flush its invalidation queue thus holding up operations of the other modules in the network were trying to get the attention of the central processor.

The presently described system has several improved features over that of the earlier system of U.S. Pat. No. 5,506,967.

These include:

a) The improved system provides for three sequence flows, designated as Load, Unload and Flush, which are all "independent"operations. These three operations can operate concurrently while in the earlier reference of U.S. Pat. No. 5,506,967, the "Flush" operation would create a logical "FULL" condition which forced the load sequence to put a "Retry" condition on to the system busses.

b) The earlier disclosure did not provide for the "ALMOST-FULL" and the "ALMOST-EMPTY" status detection features since it only had the QUEUE-FULL indicator which meant that it had to discontinue the Load operation during "Flush" conditions.

c) The presently described improved system by using the new status conditions and allowing concurrent flows provides a system which virtually "never" has the condition requiring the "Retry" hang-up situation. The earlier disclosure had this condition occurring very frequently.

d) The "Retry" situation is a significant system performance cost since many of the other system modules in the network will get put on hold, that is to say, "Hung Up" waiting for the processor to flush its invalidation queue.

e) The present system provides a special bit (seen in FIG. 7A) for self-regulation of the "depth" required for FIFO queue "flushing" which is necessary for READLOCK operations. This feature prevents the need for unnecessarily-long flush periods.

The priorly disclosed system of U.S. Ser. No. 08/078,361 now U.S. Pat. No. 5,506,967 was somewhat lacking in flexibility and performance. Thus the earlier system, which was totally implemented with a custom ASIC array, was relatively fixed. It could not be changed or enabled to expand and was generally limited to 16 words deep by an address width of 27 bits. Often times, as a result of system testing, it was found that the 16 words of invalidation queue depth were not sufficient for efficient system operations, thus the lack of flexibility and unchangeability was an unfortunate consequence.

The presently disclosed system is implemented using industry standard devices which can be as deep as desired and which can be implemented with available devices. Thus, the presently described system can operate having an invalidation queue as large as 512 addresses deep. Also, the control system of the present disclosure can be built with field programmable PALs (programmable array logic) thus allowing greater adjustability of the system as system testing may reveal necessary design changes. Thus this adjustability could provide a greater system throughput and adaptability over that of the earlier disclosure.

The area of disclosure of U.S. Pat. No. 5,506,967 was basically provided with only one status position designated as the QUEUE-FULL position which also could be set at a lesser level than "full" and designated "Logically Full". But the effect on system operation was the same in that all subsequent system bus operations had to be "Retried" until the invalidation queue was flushed over to the "NON-QUEUE-FULL" status.

This need for "Retries" is very detrimental to the operation of all of the system modules in the network, for example, such as the I/O processors. Thus the fact occurs that all of these other system modules were simply in a state of "wait" until the central processor flushed its queue which is characteristic of the earlier disclosed system. The earlier disclosed system had no means for correcting this condition.

Now, on an improved basis, the presently described system has two full status condition which are (i) FULL and (ii) ALMOST-FULL. It is only if there was an actual FULL condition occurring would the system bus "Retry" conditions be forced. However, with the present improved system, this was never seen during system tests.

In the presently developed system, when the central processor sees the "ALMOST-FULL" statue it starts the "Flush" operation. This will cause the processor to momentarily wait but then all other system modules can continue to do their work since the invalidation queue has plenty of space for addresses which can still continue to be loaded in.

The presently improved system has three independent sequences that can work "concurrently" and will be shown in the drawings involving FIGS. 1 and 2 which indicate (a) the unload flow, (b) the flush flow, and (c) the load flow.

In the earlier disclosure of U.S. Pat. No. 5,506,967 that system had to inhibit the "Load-Sequence" (forcible retry operations) if a flush was occurring since that system lacked the ability to differentiate between a real FULL condition versus only a "ALMOST_FULL" condition. Thus in the earlier system, that portion of the invalidation queue, above the "Logically-Full" position, is for all practical purposes just being wasted.

Another feature of the present system is the capability of using off-the-shelf components which are much less expensive than that of developing a Customized Application Specific Integrated Circuit (ASIC) as was done in the earlier system.

The presently improved system uses a RAM device allowing it to be 36 bits wide using a standard off-the-shelf chip operating under a programmable array logic (PAL) program.

Thus while the new improved system has an invalidation queue FIFO which is 512 levels deep and 36 bits wide, the earlier system was limited to a size of 16 words deep and 27 bits wide.

In the earlier system, there was an upper limit register 54 which contained a QTRESH upper-limit threshold which denoted when the FIFO 50 was "Logically Full" and a lower limit register 55 which contained a FLUSHLIN (lower limit threshold) which denoted when the FIFO queue 50 was "Logically Flushed."However, the new improved system provides for software programmable threshold limits whereby the ranges provided are much greater than the earlier system.

In the earlier described in U.S. Pat. No. 5,506,967 , the registers 62 and 63 were "Disabled" during the flushing operation of the FIFO queue 50 when the "QUEUE_FULL" signal on line 45 was active. However, in the new improved system, the system can still accept more addresses during the flush period since there is no inhibition to the incoming addresses.

The earlier system used a "Mandatory-Busy" Period operating such that no processor work could be performed and the bus WRITES were continually "Retried."Quite contrarily, the present improved system can accept more WRITE operations during the phases of the Mandatory-Busy Period. Thus, the throughput is not impaired as was the case in the earlier system.

SUMMARY OF THE INVENTION

A digital computer system is provided whereby a processor has normal priority access to a cache module during normal operations. The computer network includes a main system memory module connected by dual busses to external system modules in addition to the cache memory module and the processor. A spy or snoop circuit mechanism is connected to the dual system busses to extract any write operations to main memory which would change the validity of data in the cache module.

The spy circuitry mechanism includes a FIFO queue system which temporarily stores addresses of data which have been modified in the main memory module and which must now be held for invalidation cycles in the cache module.

The FIFO queue in the spy circuitry is capable of being programmably set to indicate an almost-full condition and also to indicate a almost-empty condition. When the almost-full condition occurs, then priority is given to the unloading of the FIFO queue into the cache module for invalidation operations instead of giving priority to the normal processor access to the cache module. When the load of addresses in the FIFO queue has been reduced to the programmably set almost-empty condition, then the processor module is given back its normal priority of access to the cache module. This self-regulating system of operation prevents the emergency situation where the FIFO queue could have become overloaded and not be able to accept any more address values from its spying on the system busses which would then cause a loss of integrity to the system, since certain addresses in the cache module would be invalid, but there would be no mechanism left to insure that it would be indicated as invalid during the invalidation cycles in the cache module.

BRIEF DESCRIPTION OF THE DRAWINGS

FIG. 8 is a simplified drawing of major blocks in a digital computer system;

FIG. 9 is an expansion of FIG. 8 which indicates the use of a snoop or spy circuitry mechanism to feed addresses to the invalidation queue of the cache memory.

DESCRIPTION OF PREFERRED EMBODIMENT

Figure 2:
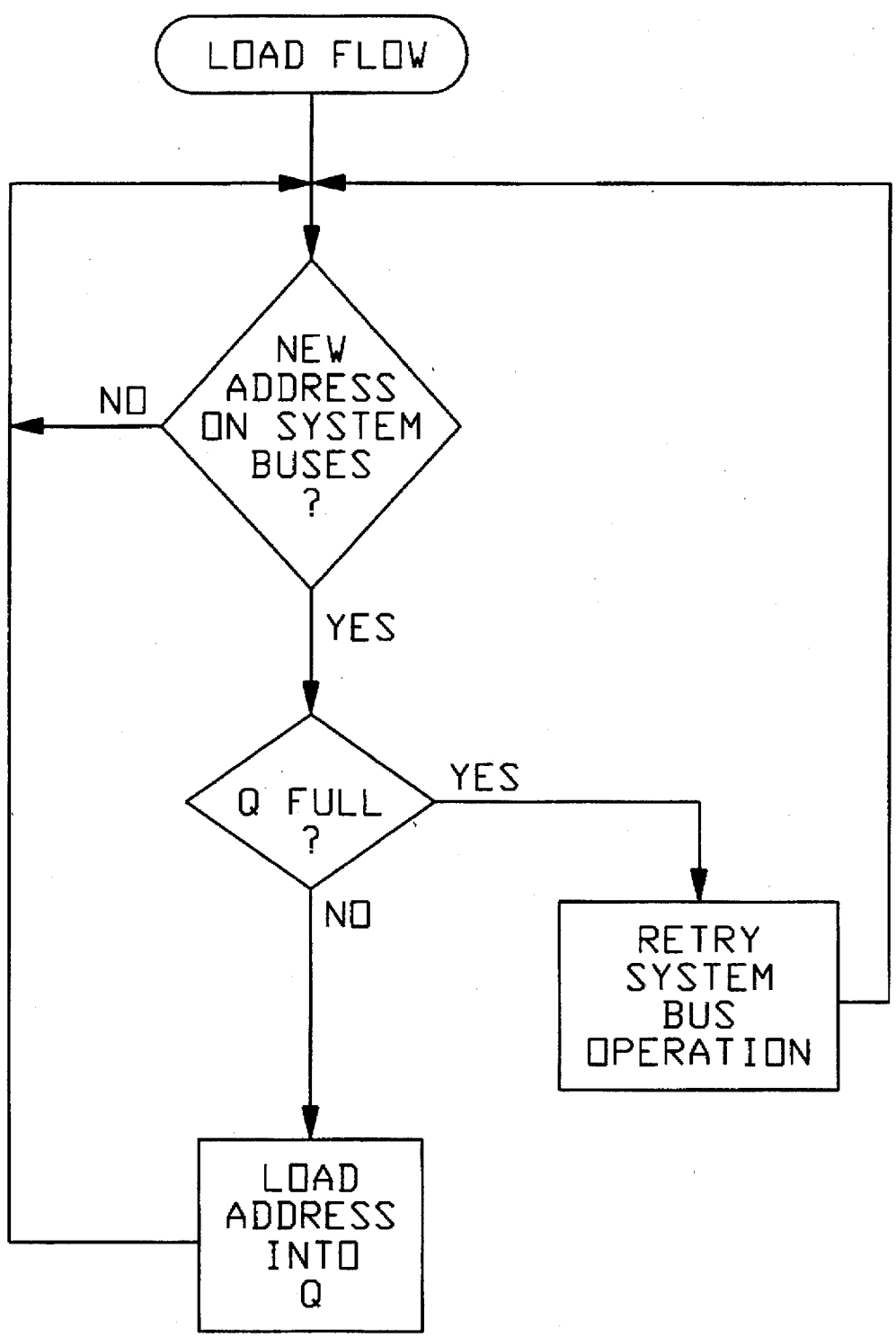
FIG. 2 is a flow chart indicating the steps involved in loading addresses into the invalidation queue.

FIG. 2 is a flow chart indicating the "load flow" of the presently described system. Here, it is indicated when a new address appears on the system busses 22 (yes), the next step is to check to see if the FIFO queue is full. If the FIFO queue is not full (no), then the new addresses on the system busses can be loaded into the FIFO queue. However, if the FIFO queue is full (yes), then it is necessary that those modules seeking to transmit on the system busses must re-try their operations and thus be placed in a hung-up condition and thus delayed in accomplishing their tasks.

Figure 1:
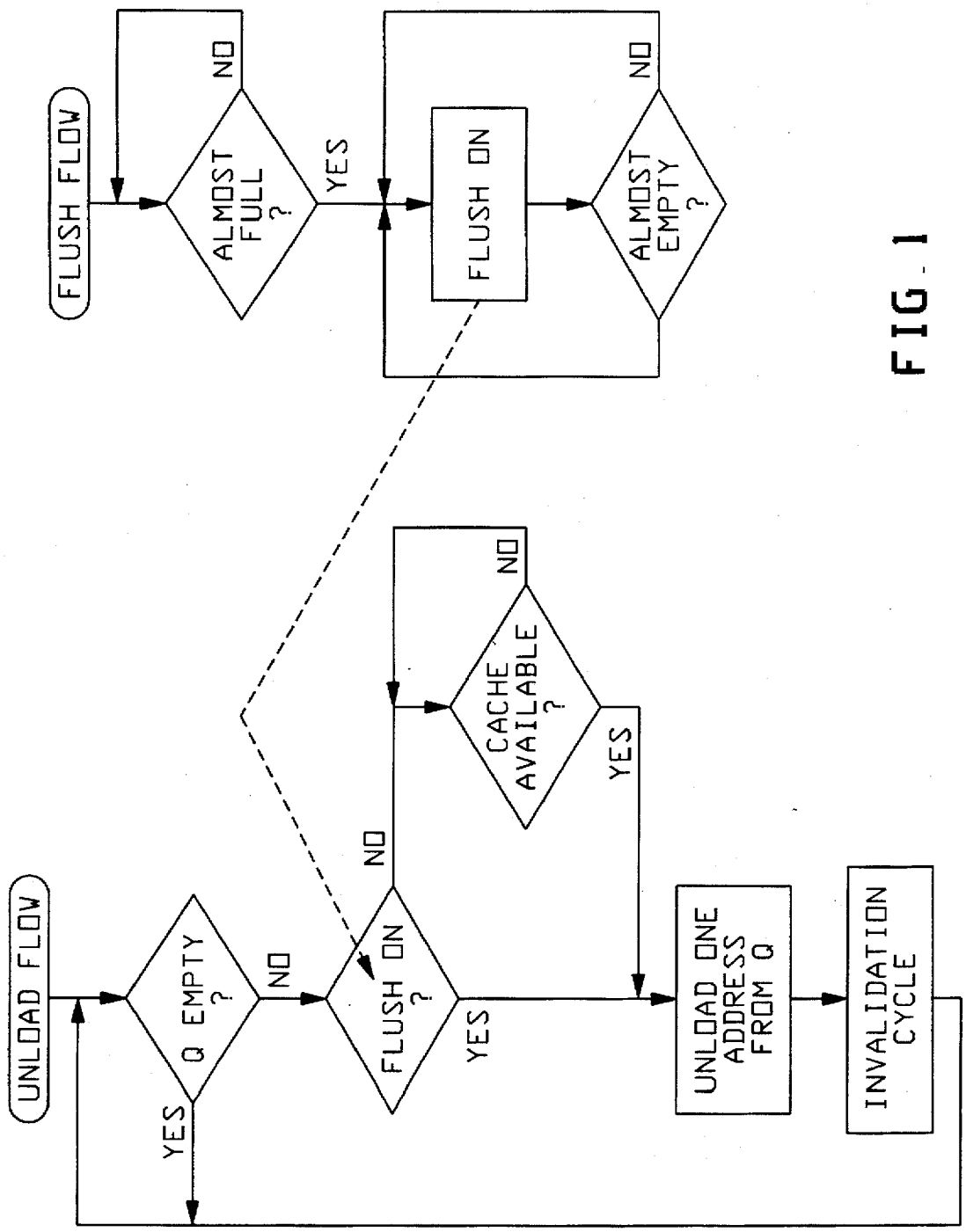
FIG. 1 is a flow chart indicating the steps involved in the invalidation cycle and also in flushing out the queue of invalidation addresses.

FIG. 1 is a flow-chart showing the operative system for "unloading" the flow of Write addresses snooped from the system busses 22. As seen in FIG. 1, as the address flow occurs, the system must first check whether or not the FIFO queue is empty. If it is not empty, (no), then the next decision point questions whether or not it is necessary to flush the FIFO queue. At this stage and looking to the right side of FIG. 1 to observe the "Flush Flow" operation, it will be seen that if the FIFO queue is almost full (yes), then the system will turn on the flushing mechanism "Flush-On". As a result of this, the dash line shows the flush-on as "yes" (left side of FIG. 1) at which time it is necessary to unload one address from the FIFO queue so that the cache module can complete an invalidation cycle. This is repeated until the signal "Almost-Empty" is derived, at which time the flush-on condition is turned off, and at (no) the question arises, is the cache available? And if it is, at (yes), then the system will unload another address from the FIFO queue for another invalidation cycle. The "flush-on" operation will occur continually as long as the FIFO queue indicates it is "Almost Full" down to the situation where it has been set at "Almost Empty", at which time the flush-on condition will be turned "off" and the mandatory operation of unloading addresses from the FIFO queue into the invalidation cycle of the cache module will be terminated in order to allow the processor 14 to assume its rightful, normal priority of access to the cache module 19.

It will be seen in FIGS. 1 and 2, that the three sequential flows: Load; Unload; and Flush are all of independent operation. All three of these sequence flows operate concurrently for the presently described system and method. In some of the earlier art, the flush operation often created or resulted in a logical "full" condition, which forced the load sequence to always be forced to do a "retry" to the system busses. Thus, holding up activity by a module seeking to complete a transmission. The present system provides the "Almost-Full" and the "Almost-Empty" status detection signals. Because of these newly developed status conditions and current flows, the present system and method will be seen to virtually never have to result in a "retry" operation due to inability to handle write address data off the system busses 22a, 22b. Earlier cache memory systems had this condition of liability very often.

It should be noted that the "retry" condition is a significant system performance degrading factor, since all of the other system modules will be getting hung-up while waiting for the processor to flush its FIFO queue device. In the present system, there is only a very rare occurrence of having to flush the FIFO queue, since it has a very large depth of storage capacity and also is sensitive to the "Almost-Full" condition and the "Almost-Empty" condition which provides a very sensitive traffic regulation system, which, for the most part, enables the processor to continue to have priority of access to the cache module except on rare emergency conditions where there is a temporary deprival of priority of access to the processor until the FIFO queue has unloaded to a safe level without having to cause retries and back-up on the system busses.

Some of the earlier types of address queues provided for detecting only one particular status condition, and this was the condition of the queue-full. But this has a detrimental affect to the system, that is to say, all subsequent system bus access request operations must be "re-tried" until the address queue is flushed to a "Non-Full" state. These re-try operations are detrimental to the operation of all other system modules, whether they be the I/O processors or the main memory modules. All these must simply wait around until the processor 14 has flushed its address queue. The present system has two full "status detection" positions which involve the "Almost-Full" condition and the "almost-empty" condition. Only if there should occur a complete fill-up (full) of the FIFO queue (a condition which has never been seen during system test of this long-depth queue) would there be the need to force system bus retries. In the present system, when the processor 14 senses the "Almost-Full" condition, it starts the Flush operation. This, of course, will cause the processor 14 to momentarily wait, but, on the other hand, all the other system modules can continue to do all their work, since the FIFO queue can continue to be loaded.

Older address queue systems had to inhibit the loading sequence and thus to force retry operations, even if a flush operation was occurring, since those systems lacked the ability to differentiate between a real "Full" condition versus only a "Near-Full" condition.

In regard to flexibility, older systems were totally implemented with custom application-specific integrated circuit arrays (ASICs). Thus, these systems could not be changed or improved or be expanded. They were generally limited to 16 words deep by an address width of 27 bits. It has been found by system testing, that 16 words of queue depth would not be sufficient, and would lack flexibility and could not be changed using the older types of system design. Quite contrarily, the improved system is implemented using industry standard, off-the-shelf devices which can provide a large depth of storage, such as 512 addresses deep. Further, the controls for the system are built with field programmable logic PALs. Since these are programmable, there is greater flexibility and adjustability when system testing reveals necessary design changes. Thus, the system is not stuck with old parameters, but can insert new parameters when required.

Figure 3:
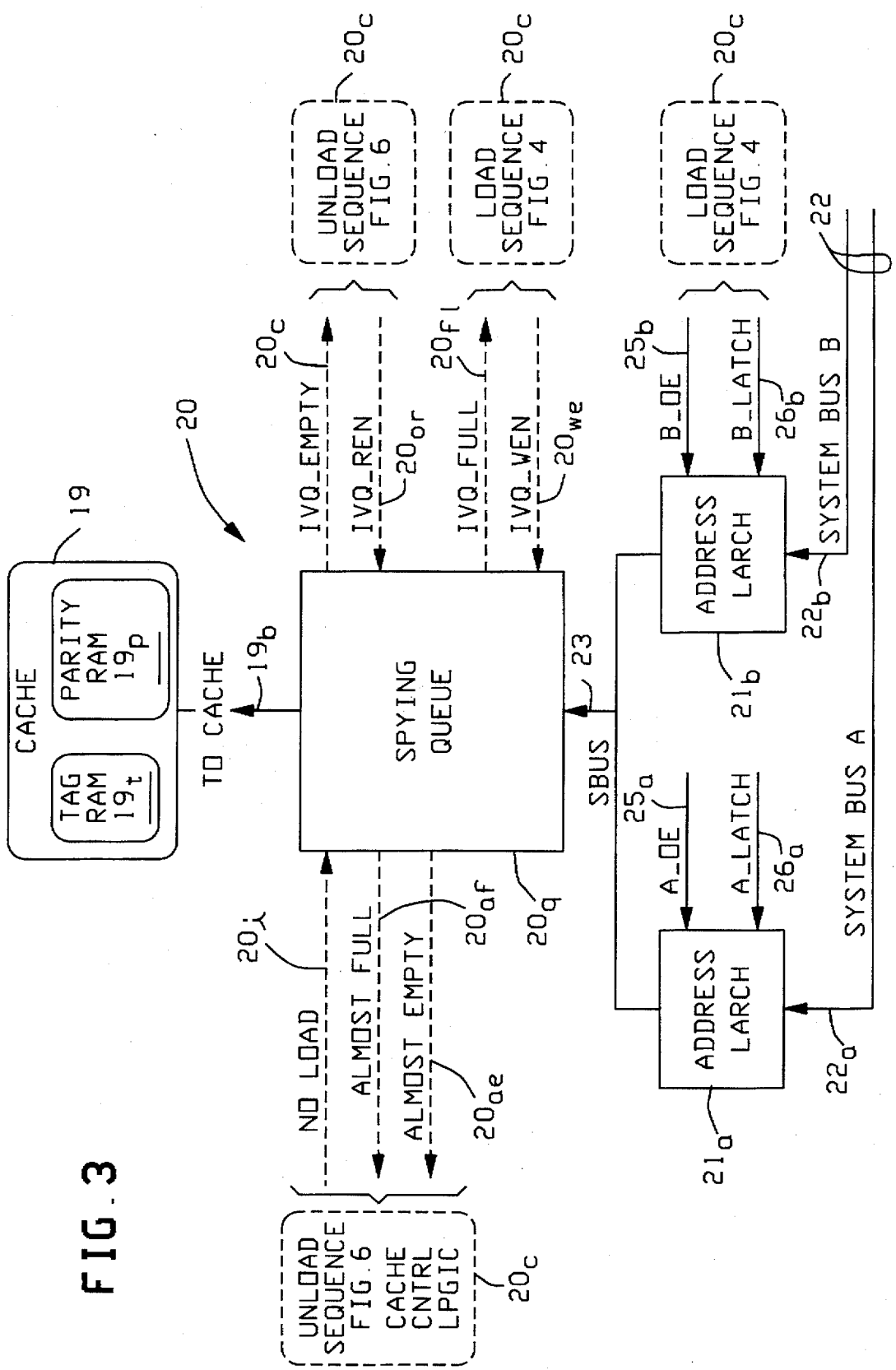
FIG. 3 is a block drawing showing the elements of the spy queuing mechanism.

The spy queuing circuitry mechanism 20 of the present system is shown in FIG. 3. Each one of the system busses 22a and 22b is seen to have an address latch respectively shown as latch 21a and latch 21b. Each latch captures any address value that was put on the system bus 22 by any system module. The two address latches share a spy bus, SBUS23 which then inputs the captured busses into the spying queue 20q. These actions occur at the clock rate and synchronously with the system busses 22a and 22b which in this embodiment operate at a rate of 16 MHz.

At the output end of the spying queue 20q, the address values are subsequently sent out on bus 19b to the cache for possible invalidation operations. The output end of the queue actions occur at the processor clock rate. This rate is variable but is asynchronous to the system bus rate and can be at a much higher rate, sometimes up to 35 MHz.

The queuing mechanism of FIG. 3 has a total asynchronous capability. Since the system busses 22 are the source for incoming address values, the incoming end of the queue must be able to capture addresses at the system bus clock rate (16 MHz). Then, since the output end of the spy queue 20 queue must drive addresses to the cache 19, it must operate at a much higher rate which is totally asynchronous to the incoming rate. The present spying queue mechanism operates to meet these requirements.

Incoming Address Capture

As seen in FIG. 3, each of the address latches has a set of control signals which are used to capture incoming addresses from the system busses 22. Thus, the address latch 21a, for the A bus 22a, has one control signal line 25a and another control signal line 26a. The first control line 25a is designated A_OE while the control line 26a is designated A_LATCH. Likewise, the address latch 21b has control lines 25b(B_OE) and control line 26b(B_LATCH). Described below are the functions involved in address latch 21a which will also apply to the address latch 21b.

A_LATCH: Operates to cause the latch to hold (capture) the input address value.

A_OE: Allows the latch to drive the captured address value on to the shared SBUS23.

IVQ_WEN: Writes the address value on SBUS23 and into the spy queue 20q (FIFO).

IVQ_FULL: Indicates the status from the FIFO to indicate that the queue is full and cannot be written into at this time.

Figure 4:
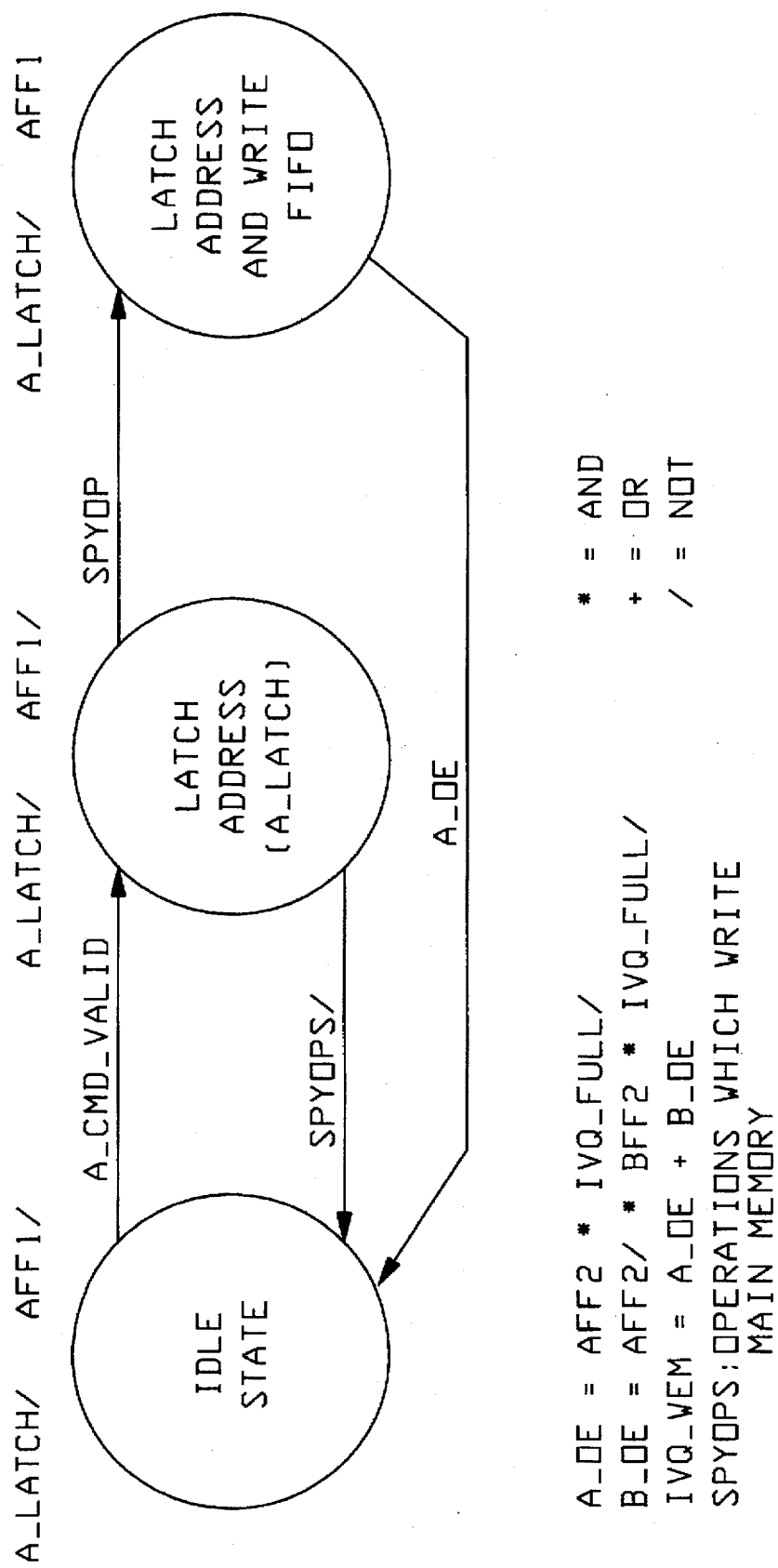
FIG. 4 shows the control sequence for capturing incoming addresses from the two system busses.

Referring to FIG. 4, there is seen the control sequence for capturing the incoming addresses. The A_LATCH is initially in the idle state when it receives a valid command after which the A_LATCH can latch the address. After the address is latched, the system can write FIFO into the queue 20q after which the latch returns to the idle state. FIG. 4 also indicates the logical equations for the control lines 25a and 25b. There is an identical sequence control for the second system bus (B bus, 22b), of FIG. 3.

Figure 5:
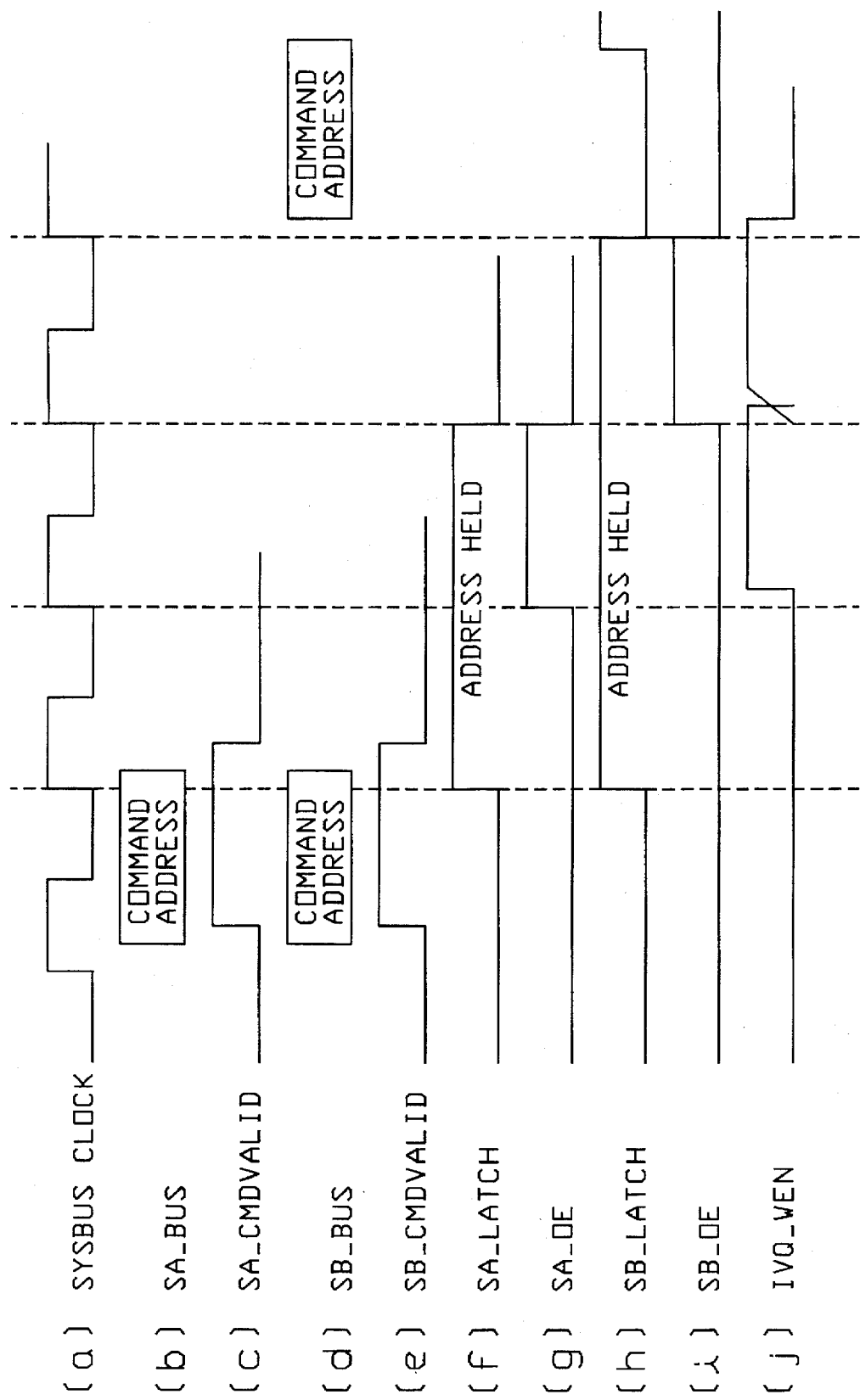
FIG. 5 is a timing drawing indicating how the incoming addresses from the system busses are captured.

FIG. 5 shows the timing sequence for capturing the incoming address from the two system busses. Line (a) shows the clock or the SBUS23. Line (b) shows the command address signal on the system bus a, 22a, while (c) shows the command valid signal on bus 22a.

Line (d) shows the command address appearing on the system bus 22b while line (e) shows that this command is valid on bus 22b.

Line (f) shows that the address latch 21a has now held the address while line (g) shows how it is released to the system bus 23.

Line (h) and line (i), likewise, show the same latching of the address from system bus 22b and the release on to the SBUS23 to the spy queue.

Line (j) indicates the writing from the SBUS into the queue 20q (FIFO).

Important to the present system is the requirement that the spying circuitry mechanism 20 never hold up normal system bus operations on systems busses 22. To meet this requirement, the captured addresses must be inputted to the queue 20q before the next possible address value on the bus is received. The timing indicated in the FIG. 5 shows how this is accomplished. The fastest addresses can come on a system bus is every four clock times, this for a memory write burst. The worst case situation is indicated such that occurs when both busses 22a and 22b send addresses at the same time. Since the input path 23 on bus 23 to the queue 20q is a shared bus (SBUS), one of the bus latches is delayed even with this worst case delay, the four clock burst rate is met. The delay between the two latches is shown on line (g) and on line (i) of FIG. 5.

It is required that the spy mechanism be "invisible" to the other system modules and to the normal system bus operations. There is one exception that can possibly occur that would affect the normal system bus operation. Thus, if the spy queue 20q were to become "Full", then both latches 21a and 21b would have to "wait" before they could write their address values into the spy queue 20q. In this case, the system bus operation is preserved but it is "slowed down" by the method of allowing the spy logic to cause the system bus operation to go into a "retry" operation. That is to say, the system bus module that started the current operation is told to abort this operation and "retry" it at a later time. Presumably, and hopefully at this later time, the spy queue 20q will not longer be "Full." The present method and system assures that no address values on either one of the system busses 22a and 22b will be missed by the spy logic even if the spy queue 20q were to be "full" temporarily.

However, even in this rare situation of "full,"this situation is essentially eliminated by the system of the present disclosure. A "self-regulating" mechanism described hereinafter will be seen to provide the means for more quickly emptying and unloading the spy queue 20q on the cache-processor end via bus 19e. This new mechanism will virtually eliminate the possibility of the spy queue 20q ever being in its "full" condition.

Outbound Address Onloading

Referring to FIG. 3, there are a series of dashed lines connected to the spying queue 20q which are used at the unloading end of the spying queue onto the bus 19b. The output line 20e IVQ_EMPTY signals that the spying queue 20q is empty. The input line 20or IVQ_REN is the control signal that causes the stored address value at the top of the queue (FIFO) which is the first value that was input to FIFO, to be read out into the output register of the FIFO. Then, all other values in the FIFO will now move upward toward the unloading end. The signal on line 20e IVQ_EMPTY indicates that the FIFO contains no address values stored within.

Also, at the unloading end of the spy queue 20q, the signal on line 20i, IVQ_LOAD is an input control line to regulate the loading of the spy queue 20q. The line 20af is the output signal to indicate that the spy queue is "almost full" and the line 20ae is the output which indicates that the spy queue is "almost empty."

At the input end of the spy queue 20q which is loaded from the SBUS23, there is seen several signals. The first of these is line 20fl, which is IVQ_FULL which indicates that the spy queue is fully loaded with address values. The line 20we, IVQ_WEN is a write enable signal into the spy queue which permits the address values on the SBUS23 to be written into the spy queue (FIFO) 20q.

Figure 6:
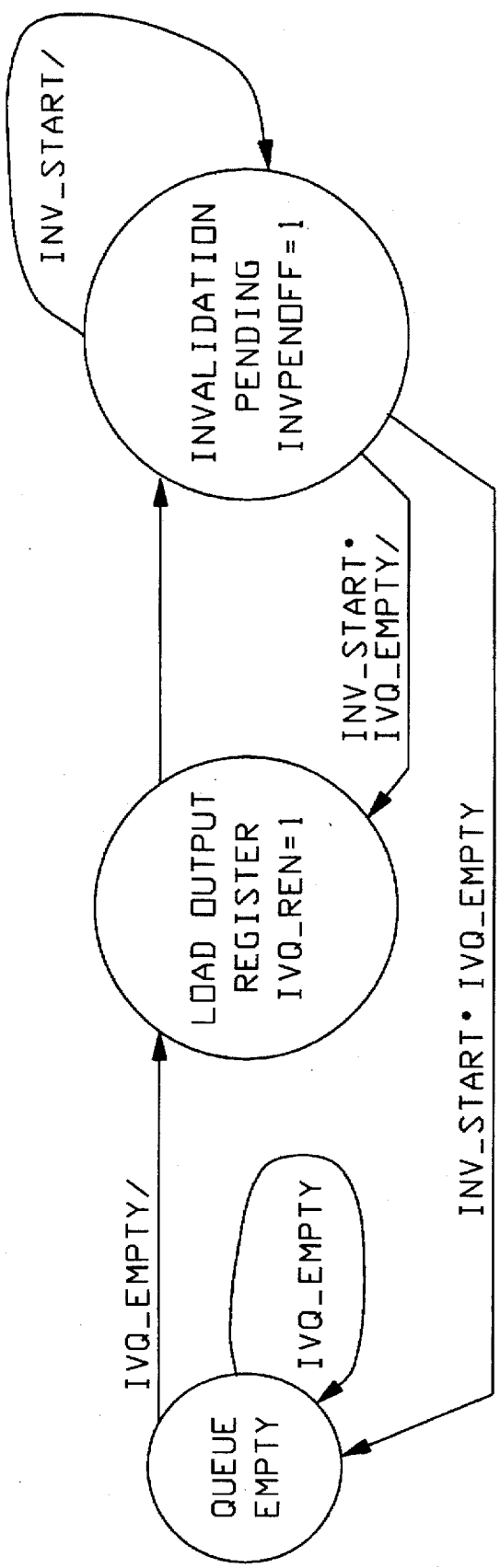
FIG. 6 is a diagram showing the unloading control sequence.

The unloading end, on to bus 19b, of the queues FIFO circuitry operates at the cache-processor clock rate (35 MHz) which is typically much faster than the system bus rate (16 MHz). The unloading end operates completely asynchronously to the input loading operation. FIG. 6 shows the unloading control sequence on bus 19b to the cache memory module 19. The unloading procedure triggers off any time that the spy queue FIFO 20q is "not empty,"that is to say, contains an address value. When the queue is not empty, as indicated by IVQ_EMPTY/, the next address value in the queue is staged into the output register of the FIFO queue by the activating of the signal IVQ_REN which in FIG. 6 is indicated as "load output register."Once this is done, a "invalidation pending" indication signal, shown in FIG. 6 as INVPENDFF=1 is sent to the cache control logic in the cache module 19. This condition will continue until such time as cache resources are made available for the invalidation process. At this time, the cache control logic in cache 19 will return the indication signal shown in FIG. 6 as INV_START, which denotes that the address value currently coming out of the FIFO queue has been accepted and used. The unload sequence can then immediately stage the next address value if the FIFO queue is not empty, or else the sequence will return to its idle state. This procedure will unload the FIFO queue 20q to the cache 19 as quickly as it is possible to do so. Here the unloading sequence will be seen to be completely independent of the loading sequence, except for the fact that you cannot unload until you have previously loaded up the FIFO queue 20q.

FIFO Spying Queue 20q

As was seen in FIG. 3, the queue logic consisted of the FIFO spying queue 20q which was fed by the SBUS23 from the address latches 21a and 21b. the spying queue 20q is built using a standard off-the-shelf, first-in-first-out device FIFO, which is a simple, relatively inexpensive standard device. In the present embodiment such a queue could be constructed from a device manufactured by Integrated Device Technology, Inc., Part No. IDT 72215, which is characterized by holding words of 18 bits with a capacity of 512 words. Two such devices are used to provide sufficient address value with which, in the present case, involves 30 address bits plus 4 parity bits for each word.

The FIFO queue device 20q provides a depth of 512 words which supplies a tremendously large buffering capability between the dual system bus operations, even when the system bus is working at maximum possible traffic conditions. And, even when there is a busy cache module 19 on the other end of the queue. The purpose is to store all possible "spy" addresses without ever needing to affect the normal operation of the system busses, that is to say, it would be virtually invisible to the other modules acting these busses. The purpose is also to not disturb the availability of the cache resource 19 to the processor 14 to any significant extent. Thus, this purpose requires a large sized amount of buffering capability. The need to hold addresses until invalidation operations occur (the unloading activity) can be squeezed between the processor-cache operations. Again, the purpose is to be invisible, this time invisible to the processor 14.

There is a potential problem associated with a very deep FIFO queue such as that described. The problem is that, if the queue were to possibly get full, and therefore the system busses 22 had to be held up, that is to say, retried as was previously described, until the FIFO queue could be emptied, then the emptying process would be very long since the queue is very deep. This long, forced, mandatory unloading of the FIFO queue could have significant negative performance affects on the local processor 14 because the processor would not be able to access its cache for a long period of time while the cache was involved with invalidation operations. Further, other system modules, such as 50, would be hung-up, waiting for the system busses 22 to be free again to operate. Both of these possible problem delay situations are not acceptable. Thus, to prevent the situation, a special "self-regulating" virtual and variable-depth queue mechanism is provided.

Virtual Variable-Depth

The spying queue 20q which is a FIFO device always remains at 512 words deep as indicated in FIG. 7. The FIFO queue can always hold 512 address values in a physical sense. However, the below-described self-regulating mechanism provided, allows the queue operation to have the effect of being a lesser depth in order to provide a special unloading operation.

Referring to FIG. 3, there were seen the dash lines which provided the control signals on line 20af, which is used to adjust the "virtual depth" of the FIFO queue. These signals include the following:

IVQ_AFUL (line 20af): This the "Almost-full" status indicator from the FIFO queue. The "Almost-full" level at which the indicator activates is programmable by means of the maintenance subsystem at initialization time.

IVQ_AEMPTY (line 20ae): This is the "Almost-Empty" status indicator output from the FIFO queue 20q. This level at which the indicator activates is programmable again via the maintenance subsystem at initialization time.

IVQ_LOAD (line 20i): This signal is an input signal to the FIFO queue 20q which is activated by the maintenance subsystem 60 at initialization time in order to load in the "Almost-Full" and the "Almost-Empty" level parameters.

The two "Almost" status condition parameters on lines 20af and 20ae, can be programmed at system initialization time by the maintenance subsystem 60. If they are not programmed, then they would assume default values. Referring to FIG. 7, there is seen a schematic drawing of the FIFO queue 20q. The address values which have been snooped from the system busses 22a and 22b and latched in the address latches 21a and 21b are then fed on the SBUS 23 into the FIFO queue 20q. As seen on the left-hand side of the FIFO queue, there are word address levels from zero to 511. At the unloading end, the cache bus 19d carries the expelled address values to the cache 19. There are two variable-depth ranges shown in the FIFO queue 20q. The "Almost-Full" flag on line 20af can be set to come on any location in the top 64 words of the queue. That is to say, any place from the actual full state (=511) up to 64 words before this state (=447).

The "Almost-Empty" flag signal on line 20ae can be set to come on any location in the bottom 64 words of the queue, that is to say, any place from the actually empty state (=0) up to 64 words before this state (=64). The "default" state of these parameters is 447 and 64 respectively.

Figure 7A:
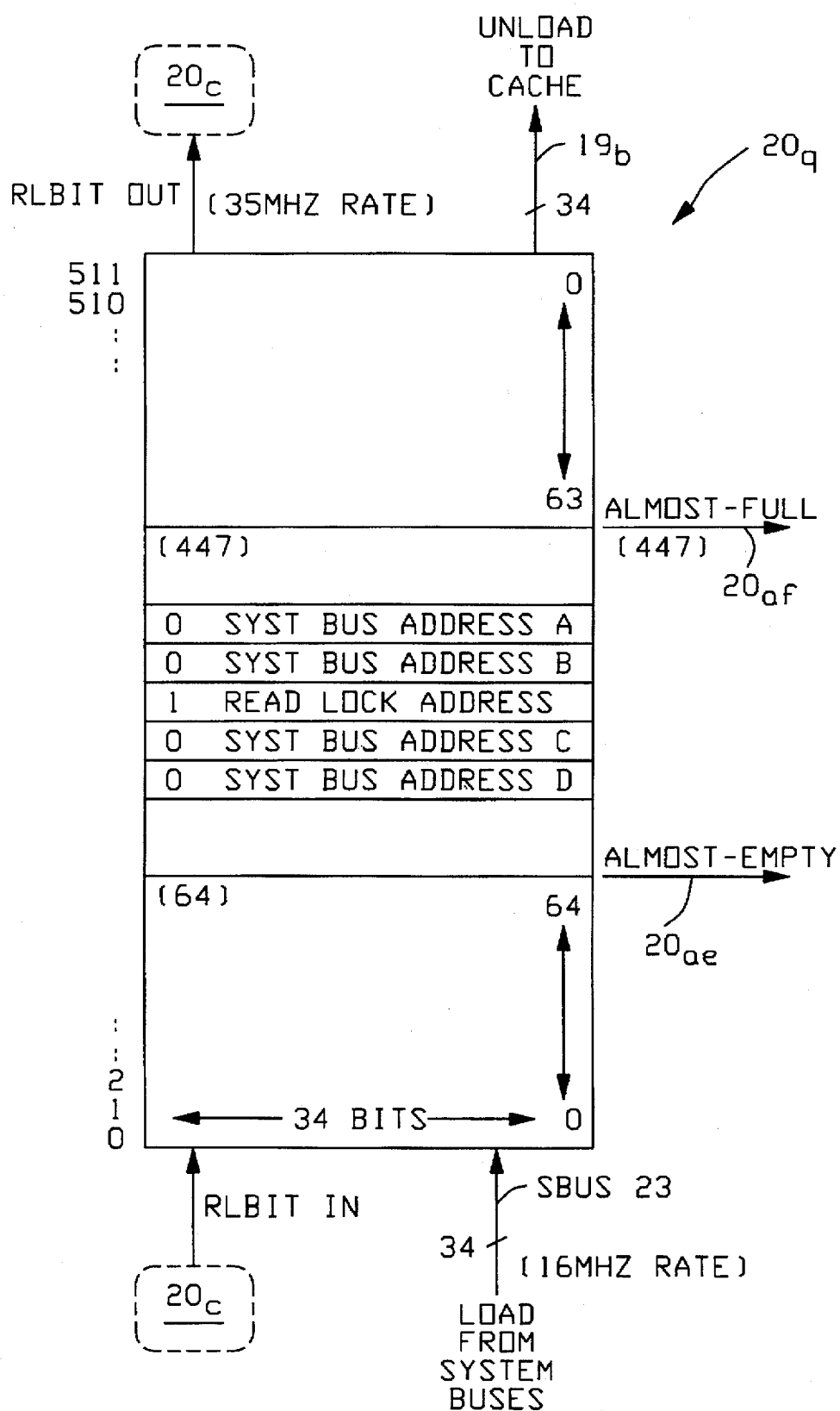
FIG. 7A is a schematic drawing of the invalidation queue.
Figure 7B:
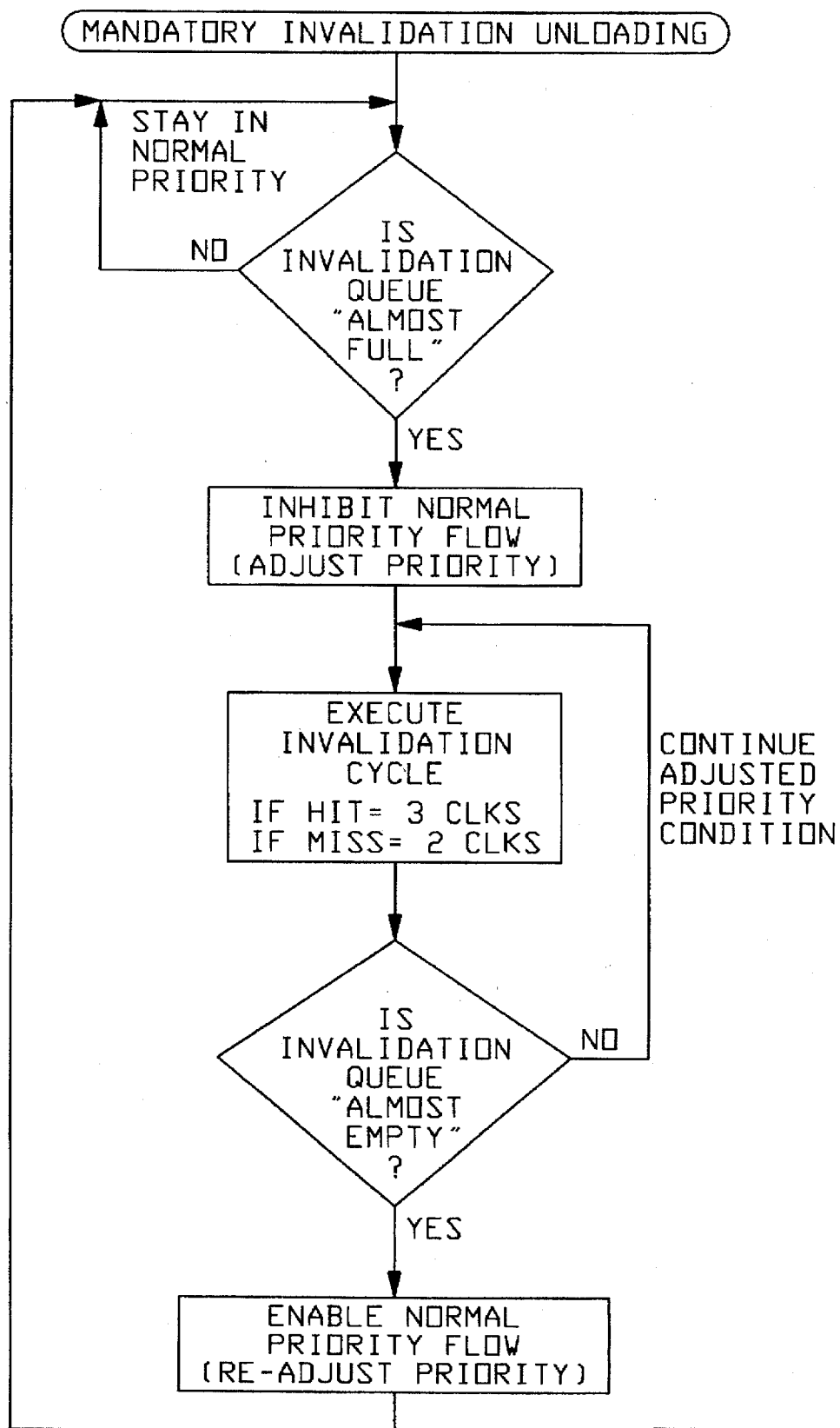
FIG. 7B is a flow chart illustrating the mandatory unloading condition for the invalidation queue.

Self-Regulating Operations, FIG. 7A

The two "Almost" parameters on lines 20af and 20ae are used in the following manner. As the FIFO queue 20q is filling-up, that is to say, loading address values from the two system busses, it has a potential depth of 512 words maximum. However, depending on where the "Almost-Full" flag has been "set", the virtual depth can be from 447 words up to the maximum depth of 512 words. Assuming for the case of an illustrative example, and assuming the default parameter values are used such that the "Almost-Full" value is 447 and the "Almost-Empty" value is 64, then when 447 address values are queued-up in the FIFO queue, the "Almost-Full" flag bit will be activated on line 20af. This flag will kick off a special unloading mechanism called "mandatory" unloading, seen in FIG. 7B. Under "normal" unloading, the processor 14 always gets first preference at the cache resources of cache module 19. The queue-invalidation process must always wait for the processor to not be using cache before it can function to complete invalidation cycles. However, when the "mandatory" condition is triggered, then the priorities are reversed. In this situation, the cache 19 is available immediately and completely to operate on the queue-invalidation operation cycle. Under this condition, the FIFO queue can be unloaded and tested, that is to complete invalidation cycles at a very fast rate. This rate will be two to three processor clock periods per single address value. In actual practice, only about 10% on the average of addresses will require a third clock time.

When the signal IVQ__WEN on line 20we of FIG. 3, is activated by the loading sequence of FIG. 4, then addresses are added into the FIFO 20q of FIG. 7A. The internal FIFO count moves up toward the 511 limit. Simultaneously and asynchronously, when the signal IVO__REN on 20or of FIG. 3, is activated by the unloading sequence of FIG. 6, then addresses are taken out of the FIFO 20q of FIG. 7A. Then the internal FIFO count moves down toward the zero limit. Then in FIG. 7A, when the loading count reaches the 447 level (default) or above, then the "Almost-Full" indicator is activated. This causes the IMV__START signal (FIG. 6) to continue to activate the unload sequence of FIG. 6 at full speed. When the FIFO count drops to the 64 level (default) or below, then the "Almost-Empty" indicator is active. This signal then stops the continuation of IMV__START and returns the unloading sequence of FIG. 6 back to normal. The factors are indicated in the mandatory unloading flow chart of FIG. 7B. Thus, when the FIFO invalidation queue 20q is "Almost-Full", the system will remove the normal priority from the processor 14 and give it to the FIFO 20q. This will enable a sequence of invalidation cycles to be executed so that if there is an address "hit" in the cache 19, the invalidation cycle will take 3 clocks, while if there is not a hit, that is to say, a "miss", then the invalidation cycle will take 2 clocks. At this stage when the invalidation queue FIFO 20q is "Almost-Empty" then the normal priority is returned back to the processor 14 for access to the cache memory.

It may be noted that while the "mandatory" fast unload procedure of the FIFO queue 20q is occurring, the address values on the system busses 22 will continue to be loaded into the FIFO queue 20q on the loading of the FIFO from SBU23. However, it may be noted that the unloading process operates at twice the clock frequency and thus needs fewer clock periods. Thus, the FIFO queue is definitely unloading at a faster rate than it is loading up.

Regarding the "filling" side of the queue, it may be noted that the "mandatory" condition is kicked off when there are still 64 locational spaces left in the queue before it can go "full". As a result, the FIFO queue can virtually "never" get "full" and thus hold up the system bus operations on bus 22.

During "mandatory" unloading, the processor 14 is somewhat delayed in that it cannot use the cache 19 for some period of time. In this case, it is desired to minimize the "mandatory" operation. Here, the second parameter of "Almost-Empty" on line 20ae is of assistance here. This almost-empty flag allows the FIFO queue to become operable as variable-depth in the opposite direction as it unloads under mandatory conditions. As the mandatory unloads occur, the "Almost Empty" flag on line 20ae is monitored. When the FIFO queue level hits 64 words (default level) at the almost-empty marker, the flag signal on line 20ae comes on. As a result of this, the mandatory condition is immediately exited. Then immediately, the processor 14 is given back its highest priority status and the system will function back in normal operation.

In addition to the "almost full" and "almost empty" programmable self-regulating features of the variable-depth queue, the following is a special feature which greatly adds to the flexibility of this invention.

Referring to FIG. 7A, it is seen how the programmable "almost full" and "almost empty" indicators are used to regulate when the "mandatory invalidation" condition is initiated ("almost full") and terminated ("almost empty"). A second self-regulating feature is used to control the "Queue Flush" operation. This operation is triggered off when the processor executes a READLOCK operator.

When a READLOCK operator occurs, the invalidation queue 20q must be "flushed" of all addresses that have occurred prior to the READLOCK operator being executed onto the system busses. This "flushing" means to remove each address and test it against the cache tag 19t (FIG. 3) for possible invalidations. During this "Queue Flush" mode, the invalidation queue is given exclusive control and access to the cache Tag RAM facilities, i.e., the processor cannot access the cache. This special flushing operation is necessary to assure that the processor 14 can never read "old" data (which will be invalidated by some address value contained already in the queue) immediately following the READLOCK.

In prior queue designs, the only method by which this could be assured was to "completely empty" the queue of all prior address values. However, in the prior art, while the flushing process of emptying the queue to the cache was in process, new additional address values from the various other system modules could come in from the system busses. In the prior art, because the flushing out process (unloading of the queue) was faster than the filling process (loading of the queue from the system busses), the complete emptying of the queue would eventually occur. However, in the prior art, the flush out process was significantly lengthened unnecessarily.

The new feature described herein eliminates this unnecessary flushing of the added addresses (i.e. those that actually occur after the READLOCK is on the system busses). Referring to FIG. 7A, it is seen that the actual address values received from the system busses that are inserted (loaded) into the queue are 34 bits wide—30 bits of address and 4 bits of parity. However, fortuitously, the off-the-shelf FIFO device used is physically 36 bits wide. Thus, these two extra bits are free and give the possibility of this new special feature. The feature only uses one of the spare bits, the other remains unused.

From FIG. 7A, it is seen that the new bit, called RLBITIN (READLOCK bit in), is loaded into the queue at the same time that the Load Sequence (FIG. 4) loads in the address values. This bit value is normally forced to a zero value by the Control Logic PAL 20c. For all addresses received, except for a READLOCK operation executed by processor 14, the bit is zero and has no effect. However, when the processor executes a READLOCK operator, the Control Logic PAL raises the RLBITIN value to a "one" value. Therefore, when the address for this READLOCK is executed onto the system busses and its address is therefore loaded into the queue, the special bit is at a "one" value.

Normally, operations initialized by processor 14 are NOT loaded into the invalidation queue 20q. That is, only the system bus operations of "OTHER" system modules will be loaded into the queue. But the READLOCK of this processor is the exception. It causes the signal A__CMD__VALID of FIG. 4 to initiate a queue load sequence. Again, normally, this signal is only activated by system bus operations initiated by other system modules.

FIG. 7A shows a sample of a READLOCK condition in the queue. Here, a number of address values (2 addresses)

are in the upper portion of the queue prior to the READ-LOCK. That is, they occurred in time on the system busses prior to the processors execution of this READLOCK. On FIG. 7A, these addresses are seen denoted as "A" and "B." For these address values, it is seen that the RLBITIN is a zero. Therefore, when these addresses are unloaded from the upper side of the queue, the RLBITOUT signal will be "zero." Thus, if the "Queue Flush" operation is in progress because of the READLOCK operator, it will continue because the RLBITOUT values are zero. This will continue while the bit out is "zero."

FIG. 7A also shows that "following" the READLOCK address having been executed on the system busses and loaded into the queue, there have been other system bus operations by other system modules. The sample shown are denoted as "C" and "D". Again for these addresses, the RLBITIN value is zero. The new feature operates in the sequence indicated in steps 1–5 below.

1. Whenever the RLBITOUT unloading from the queue is zero, it has no action.
2. When processor 14 executes a READLOCK operator, the RLBITIN is set to a "one" value. Also, this initiates the "Queue Flush" operation where the queue will be unloaded and tested at its maximum speed and the processor cannot access the cache 19.
3. When the READLOCK is executed to the system busses, its address value plus the RLBITIN=1 is loaded into the queue, 20q.
4. While the "Queue Flush" operation is in progress, additional address values may be received on the system busses from other system modules. However, when these addresses are loaded into the queue, the RBITIN is back to a "zero" value.
5. When the RBITOUT bit for the READLOCK is finally unloaded from the queue (i.e., a RLBITOUT=1) then the "Queue Flush" mode is terminated and the processor 14 can again have access to the cache 19. At this point, all prior address values contained in the queue prior to the READLOCK have been unloaded and tested for invalidation.

Thus, the requirements that necessitated the "Queue Flush" operation have been met with the least possible impact on the processor, since no unnecessary address values (those following the READLOCK) have been flushed. Further, the special self-regulating, virtual variable depth feature was accomplished most efficiently since the FIFO had spare bits and the Control Logic was implemented with "flexible" PALs. Only two pins (RLBITIN and RLBITOUT) were used on the flexible PAL.

The presently described system and method for self-regulation in a variable depth queue, but with simple industry-standard parts, has been shown to operate under normal conditions and mandatory conditions depending on whether the FIFO address queue is almost full or almost empty. The system solves the problems required when a spy or snooping queue system for setting-up invalidation cycles to a cache may sometimes interfere with a processor's access to the cache. Thus, under normal conditions, the system permits the processor to get immediate and fast cache access. While doing this, it assures that the cache data integrity is protected by capturing all of the address values on both system busses that have been modified in the main memory. The large depth of the described FIFO queue assures that the normal processor high-priority status will occur with non-stop system operation. By programming the FIFO queue of invalidation addresses with a set of "almost" flags to provide a soft method for tailoring the queue depth over a range of plus or minus 128 words, works for an ideal traffic control situation. When the almost-full condition is signaled from the FIFO queue, a "mandatory" condition will provide a self-regulating mechanism for quickly cleaning out the FIFO queue under very busy system bus traffic conditions. The self-regulating mechanism under the "mandatory" unloading condition, will then assure that the processor is held up only a minimal amount of time before the processor is returned to its first priority of access to the cache memory module involved.

While one specific embodiment of the above-described self-regulating cache of the self-regulating FIFO queue system for unloading address words for invalidation cycles under emergency conditions has been described, it should be understood that other embodiments may be possible which still fall within the scope of the attached claims.

What is claimed is:

1. In a network using a central processor with cache memory connected, via dual system busses, to main memory and an I/O module, a system for optimally balancing cache access between a central processor and a FIFO invalidation queue means for enhanced throughput, said system comprising:

(a) spy logic means for sensing the occurrence of WRITE OPs on said system busses, including:
(a1) FIFO invalidation queue means for storing N addresses where N is greater than 500;
(a2) means to sense when said FIFO queue means is almost full at the level of ⅞N;
(a3) means to sense when said FIFO queue means is almost empty at the level of ⅛N;
(b) means to control priority of access to said cache memory according to said level of addresses in said FIFO queue means.

2. The system of claim 1 where said means to control includes:

(a) sharing cache memory access between said central processor and said FIFO queue means when said address level is below ⅞N and above ⅛N and giving the higher priority of access to said central processor;
(b) flushing addresses from said FIFO queue means when said address level is greater than ⅞N and giving higher priority of access to said FIFO queue means in executing invalidation cycle.

3. The system of claim 2 wherein said means to control includes:

(a) means to continue loading addresses into said FIFO queue means while concurrently flushing addresses from said FIFO queue means.

4. The system of claim 2 wherein said means to control includes:

(a) means for sensing a READLOCK OP being initiated by said central processor;
(b) means to flush all addresses in said FIFO queue means which were resident prior to said READLOCK OP.

5. In a computer network wherein a Central Processing Module includes a central processor, a cache memory and a spying circuit connected via dual system buses to a system main memory and I/O modules and wherein the network is initiated by a maintenance subsystem, a self-regulating spy circuit queuing system for accumulating write addresses for eventual transfer to said cache memory for invalidation cycles, said spy circuit system comprising:

(a) a FIFO address queue for receiving write addresses made to the system main memory and for storing these received addresses in said FIFO queue, said FIFO queue including:

(a1) N addressable locations for holding write address values received from said system bus means where N is greater than 500, and including:
  (a1a) upper limit sensing means to sense when said FIFO address queue has 7/8N words of address loaded into it;
  (a1b) means to signal an "almost-full" signal to inhibit said central processor means from accessing said cache memory and to initiate access priority for said FIFO address queue to execute invalidation cycles to said cache memory;
  (a1c) lower limit sensing means when said FIFO address queue is reduced to holding 1/8N addresses;
(b) means, responsive to said lower limit sensing means, to give cache access priority to said central processor.

6. In a network having a central processor with cache memory connected, via dual system busses, to main memory and I/O modules, a method for ensuring that modified write data in main memory will always be placed in a FIFO address queue means for invalidation cycles to said cache memory in order to enhance throughput and to maintain constant integrity, comprising the steps of:

(a) spying on a dual system bus means to retrieve any write addresses which would modify the data in said main memory;

(b) loading said write addresses from said dual system bus means into a FIFO address queue means;

(c) programming an almost full-level parameter into said FIFO address queue means in order to signal when said FIFO address queue means is 7/8 full of addresses;

(d) providing priority of cache access for invalidation operations when said FIFO address queue is 7/8 full, said priority being senior to the access priority of said central processor;

(e) flushing said FIFO queue means by granting cache access priority for invalidation cycles; while also allowing address loading into said FIFO queue means;

(f) programming said FIFO address queue means to indicate when said queue is almost empty at the level of 1/8 its full capacity of addresses;

(g) sensing when said FIFO queue is at its 1/8 full level of capacity;

(h) granting cache access priority to said central processor, said priority being senior to said FIFO address queue means.

* * * * *